Feb. 1, 1966 R. G. WOOLWORTH 3,232,355
GARDEN TOOL HANDLE

Filed Oct. 16, 1963 2 Sheets-Sheet 1

INVENTOR.
Richard G. Woolworth

Feb. 1, 1966 R. G. WOOLWORTH 3,232,355
GARDEN TOOL HANDLE
Filed Oct. 16, 1963 2 Sheets-Sheet 2
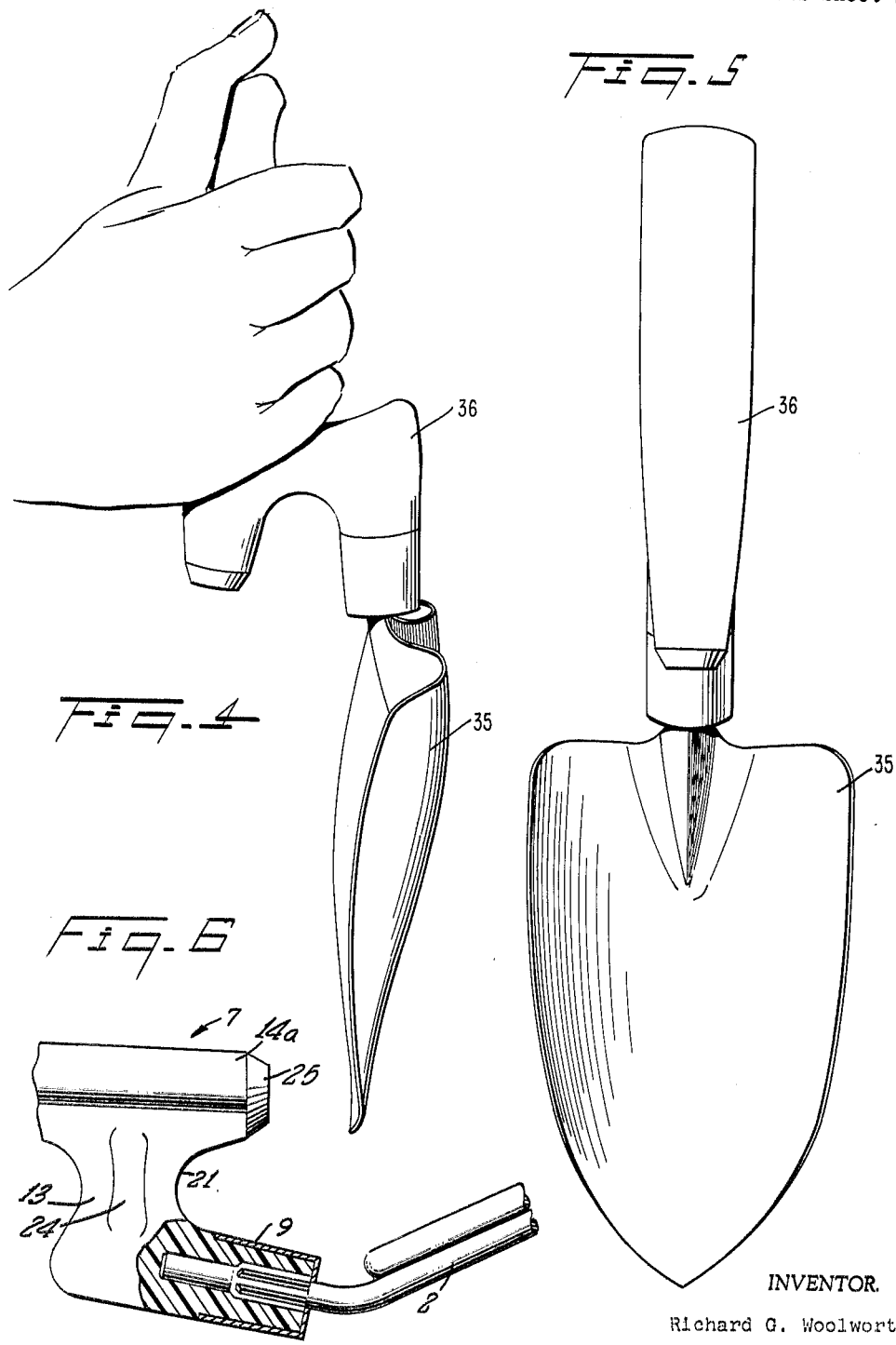
INVENTOR.
Richard G. Woolworth 3,232,355
GARDEN TOOL HANDLE
Richard G. Woolworth, Lancaster, Pa., assignor to Animal Trap Company of America, Lititz, Pa.
Filed Oct. 16, 1963, Ser. No. 316,557
4 Claims. (Cl. 172—378)

This invention relates generally to gardening tools and more particularly to a new and improved handle for gardening and other tools.

Heretofore, handles on gardening tools have been simply an extension of the tool shank and may or may not have recesses therein spaced longitudinally of the handle for receiving the fingers of the user of the tool. This type of known handle requires that the handle be very firmly gripped by the user particularly if the gardening tool is a ground-working tool and is being used in hard ground, for example a trowel being used to dig relatively hard ground. The absence of abutments or structure by which the user can employ various hand and/or finger grips on the handle thereby greatly reduces the effectiveness of the handle and the tool.

It is a principal object of the present invention to provide a new and improved handle for use on gardening tools having portions thereof improving the grip characteristics of the handle thereby improving the utility of the gardening tool itself.

Another object is to provide new and greatly improved ground-working gardening tools.

The handle according to the invention is for use on tools having a shank. The handle comprises a first portion for receiving and holding the shank extending longitudinally therein. The shank is inserted into an opening in a forward end of the first portion. An offset portion at a rear end of the first portion opposite to the forward end thereof is provided integral with the shank-receiving portion. A grip portion of the handle is connected to the offset portion with all of the portions disposed in a common plane. The grip portion has a rearwardly extending major part thereof extending away from the offset portion and in a direction away from the gardening tool and has a forwardly extending part extending forwardly of the offset portion.

The offset portion of the handle has a rearwardly disposed surface merging smoothly with an underside surface of the grip portion and defining an abutment surface for the hand of the user of the tool. The offset portion, moreover, has a forward arcuate and concave surface merging smoothly with the first portion and the forward portion of the grip portion and jointly defining therewith a finger grip surface on the handle.

Other features and advantages of the handle and gardening tools in accordance with the present invention will be better understood as described in the following specification and appended claims in conjunction with the following drawings in which:

FIG. 4 is a side view of a gardening trowel to which a handle according to the invention has been applied and is illustrative of another way of gripping the hand according to the invention;

FIG. 5 is a front elevation view of the gardening tool in FIG. 4; and

FIG. 6 is a fragmentary sectional view of a portion of the handle according to the invention illustrating the mounting of a tool on the handle.

While the handle according to the invention will be illustrated and described as applied to two types of gardening tools, it will be understood that it is equally applicable to other gardening tools having a handle-receiving extension or shank. Moreover, those skilled in the art will understand that the handle according to the invention can likewise be applied to other hand tools with handle-receiving members, for example cement finishing trowels and the like.

Figure 1:
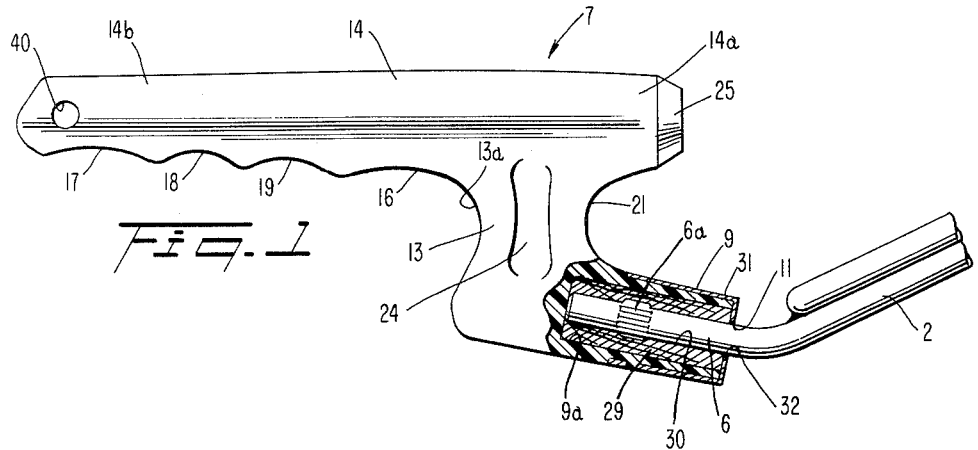
FIG. 1 is a side elevation view of a handle according to the invention.
Figure 2:
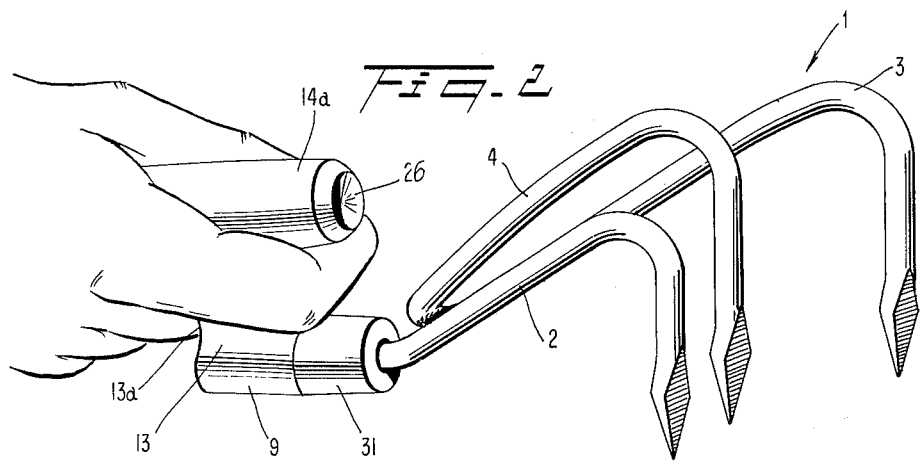
FIG. 2 is a perspective view of a cultivator to which a handle according to the invention is applied and is illustrative of the manner in which the handle is gripped.
Figure 3:
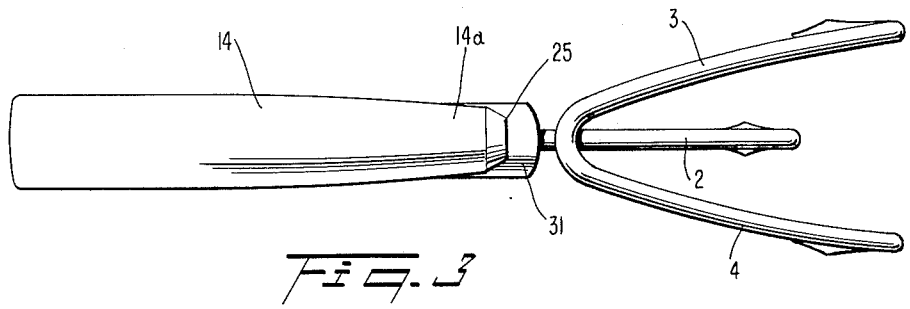
FIG. 3 is a plan view of the cultivator in FIG. 2.

Referring to FIGS. 1–3 inclusive, a handle according to the invention is illustrated as applied to a hand cultivator 1 having for example, a tine 2 to which is secured, by welding, a shaped metal member bent to form two tines 3, 4. The tine 2 is provided with a handle-receiving member or shank 6 to which is secured a handle 7 according to the invention.

The handle 7 comprises a first portion 9 for receiving and holding the shank 6 extending longitudinally therein. The portion 9 is provided with a forward end opening 11 through which the shank 6 extends axially. The first portion 9 has secured thereto an integral offset portion 13 at a rear end of the first portion and to which is secured a grip portion 14. The grip portion 14 is integral with the offset portion. The grip portion of the handle comprises a forward part or portion 14a extending forwardly of the offset portion 13 and a rearwardly extending grip part or portion 14b. All of the various parts or portions of the handle are disposed substantially in a common plane. The grip portion 14 and the other portion 9 for receiving the shank of a tool each have a longitudinal axis and these axes are substantially in the same plane. The axes converge toward the rear end of the grip portion defining therebetween an acute angle.

The offset portion 13 has an axis of symmetry normal to the longitudinal axis of the grip portion 14 and a rear surface 13a which merges smoothly with the rear end of the shank-receiving part 9 of the handle and with an underside surface 16 of the rearwardly extending part of the grip 14 which is, moreover, configured with recesses 17, 18, 19 for receiving the fingers of the user of the tool handle according to the invention. The surface 13 and another surface 21 later described are both symmetrically concave relative to the axis of symmetry of the offset portion 13.

The offset portion 13 comprises a forwardly disposed surface 21 heretofore mentioned and merging smoothly with the underside of the forwardly extending part 14a and the tool holding portion 9 defining jointly therewith a concave finger grip surface which as shown in FIG. 2 receives a finger of the user of the handle. The offset portion 13 has a length normal to the longitudinal axis of the grip portion 14 sufficiently long so that the grip portion, the offset portion and a plane tangential to a lower side of the portion 9 and parallel to the axes of the portion 9 and converging toward the longitudinal axes of the rear part of the grip portion defining a space in which the fingers of the user of the device are protected and do not extend past this plane. It being understood that the axes of the grip portion and the other portion 9 converge toward the rear end of the grip portion.

The handle 7 is made of a suitable material, preferably molded plastic provided with suitable structure, for example a recess 24 for controlling dimensionally the plastic during a curring cycle thereof. The forward portion 14a is provided with a plastic tip 25, preferably of a different color than the rest of the handle, having a central recess 26. Preferably, the shank-receiving portion or tool-holding portion 9 of the handle is constructed with a bore, as shown in FIG. 6, for receiving the shank 6 extending longitudinally therein. The shank 6 is provided with lateral extensions, for example extensions 6a angularly spaced circumferentially thereof for locking the shank 6 against angular rotation relative to the handle bore, not shown. It will be understood by those skilled in the art that the opening or bore in the portion 9 is shaped to receive these extensions and holding handle fixed therein in conjunction with a ferrule for example like a ferrule 31 later described and which is preferably made of a metal and fits snugly over the portion 9 and extends axially thereof a limited extent.

Another construction for mounting the handle according to the invention is illustrated in FIG. 1 in which the portion 9a is provided with a large bore 9a for receiving an insert 29 therein made of a suitable material, for example a hard wood, in which a bore 30 is suitably provided for receiving the shank and the lateral extension 6a thereof. The insert and shank receiving portion thereof are provided with the ferrule 31 having forwardly extending surfaces for holding the insert 29 in the bore 9a and provided with a central opening 32 for allowing the handle to extend inwardly into the bore 30 in the insert.

The handle according to the invention is likewise usable on other ground-working tools, for example, a trowel or spade 35 provided with a handle 36 shaped the same as the handle 7. In both FIGS. 2 and 4, the manner in which the backside or rearwardly facing surface of the offset portions of the handle functions as an abutment for the hand of the user as illustrated. FIG. 2 clearly illustrates the manner in which the forward front surface thereof can be employed as a finger grip surface in conjunction with the backside surface serving as an abutment. The forwardly extending part 14a is shown extending forwardly sufficiently to protect the finger of the user in the forward finger grip. The tool-receiving portion of the handles in each instance is disposed for mounting and holding the respective tool and cooperates with the offset portion to provide a handle by which the user can improve the utility of the tool itself by gripping it in different ways, for example, the trowel 4 can be used for digging if gripped in the manner in which the cultivator is illustrated being gripped in FIG. 2 and for a strong digging action in the manner of a pick or spade if gripped in the manner illustrated in FIG. 4.

The tool-receiving or tool-holding portion 9 has a longitudinal axis diverging from the longitudinal axis of the grip portion 14 permitting the offset portion 13 to be shortened and strengthened and, moreover, providing an asthetic appearance in the handle according to the invention. The grip portion 14 on the handle tapers gradually toward the rear of the handle adjacent which may be provided a through aperature, for example an aperture 40, for providing means by which the tool can be suspended for storage when not in use.

The handle may be constructed as a single molded unitary whole but is preferably constructed of two plastic molded halves which are bonded together along a plane passing centrally and longitudinally of all of the above-mentioned portions.

While preferred embodiments of the invention have been shown and described, it will be understood the many modifications and changes can be made within the true spirit and scope of the invention.

What I claim and desire to secure by Letters Patent is:

1. A handle for a tool having a handle-receiving shank, said handle comprising, an elongated grip portion having a front end part having a front end and a rear end part having a rear end, an offset portion integral with said grip portion spaced from both of said ends and disposed close to said front end of said grip, another elongated portion shorter axially than said grip portion and disposed extending axially from said offset portion in a direction away from said offset portion generally in a direction in which said front end part of said grip portion extends, said grip portion and said another elongated portion each having a longitudinal axis, the axes being disposed substantially in a common plane and disposed converging in a direction toward said rear end of said grip portion, said offset portion having a concave surface merging smoothly with said grip portion and said another elongated portion defining a front concave finger grip surface on said offset portion for receiving a finger of a user, said another elongated portion having a greater length than said front end part of said grip portion, said front end part of said grip portion extending between said offset portion and said front end thereof, said front end part extending forwardly of said concave finger grip surface a distance sufficient to define a space of sufficient dimensions so that the finger of the user does not project forwardly of said front end, said another elongated portion having an axial bore for receiving a shank of a tool, said offset portion having sufficient length in a direction substantially normal to said axis of said grip portion to space said another portion sufficiently to define a space between the grip portion, the offset portion and a plane substantially parallel to said axis of said another portion and substantially tangential to said another portion and converging toward the longitudinal axis of said rear part of said grip portion, and said space being sufficient to receive the fingers of a user when said grip portion is gripped without the fingers of the user extending past said plane.

2. A garden tool having a handle-receiving shank, a handle fixed on said shank comprising, an elongated grip portion having a front end part having a front end and a rear end part having a rear end, an offset portion integral with said grip portion spaced from both of said ends and disposed close to said front end of said grip portion, another elongated portion shorter axially than said grip portion and disposed extending axially from said offset portion in a direction away from said offset portion generally in a direction in which said front end part of said grip portion extends, said grip portion and said another elongated portion each having a longitudinal axis, the axes being disposed substantially in a common plane and disposed converging in a direction toward said rear end of said grip portion, said offset portion having an axis of symmetry substantially normal to said longitudinal axis of said grip portion, said offset portion having a concave surface merging smoothly with said grip portion and said another elongated portion defining a front concave finger grip surface on said offset portion, said another portion having a greater length than said front end part of said grip portion, said front end part of said grip portion extending between said offset portion and said front end thereof, said another elongated portion having an axial bore receiving said shank of said tool, said offset portion and said another elongated portion disposed jointly defining a 22 concave surface on a side of said offset portion opposite to the first mentioned concave surface, said first-mentioned concave surface and said another concave surface being disposed symmetrically concave relative to said axis of symmetry of said offset portion, and said offset portion having sufficient length in a direction substantially normal to said longitudinal axis of said grip portion to space said another portion from said grip portion sufficiently to define a space between the grip portion, the offset portion and a plane substantially parallel to said axis of said another portion and substantially tangential to said another portion and converging toward the longitudinal axis of said rear part of said grip portion, and said space being sufficient to receive the fingers of a user when said tool is in use and substantially preclude the fingers of the user from extending past said plane, whereby the offset portion and said elongated portion protect the user's hand and fingers when said tool is in use and said handle is gripped at said grip portion.

3. A garden tool according to claim 2, in which said tool comprises a cultivator.

4. A garden tool according to claim 2, in which said tool comprises a trowel.

References Cited by the Examiner

UNITED STATES PATENTS

| | | | |
|---|---|---|---|
| D. 99,652 | 5/1936 | Wehde | 145—61.12 |
| 95,367 | 9/1869 | McWhinney | 172—381 |
| 1,099,201 | 6/1914 | Payton | 16—110 |
| 2,063,653 | 12/1936 | Agostineto | 145—61.12 |
| 2,076,836 | 4/1937 | Goldblatt | 16—110 |

ABRAHAM G. STONE, *Primary Examiner.*

T. GRAHAM CRAVER, *Examiner.*